Figure 1:
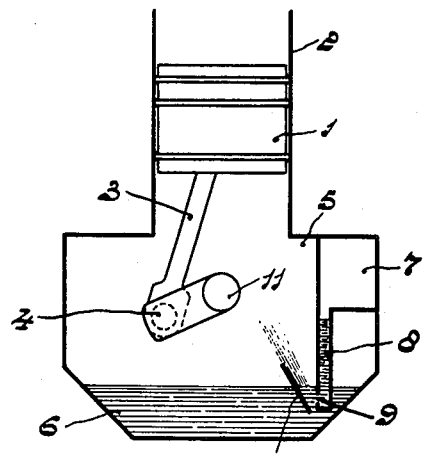

Dec. 27, 1955     J. C. C. BOLSIUS ET AL     2,728,412
MOTOR OILING SYSTEM
Filed July 15, 1950

INVENTORS
JOHANNES CONSTANT CLEMENS BOLSIUS
WILLEM CORNELIS TER STEGE
BY Fred M. Vogel
AGENT

United States Patent Office 2,728,412
Patented Dec. 27, 1955

2,728,412

MOTOR OILING SYSTEM

Johannes Constant Clemens Bolsius and Willem Cornelis ter Stege, Dordrecht, Netherlands, assignors to Hartford National Bank and Trust Company, Hartford, Conn., as trustee Application July 15, 1950, Serial No. 174,016

Claims priority, application Netherlands August 17, 1949

2 Claims. (Cl. 184—6)

This invention relates generally to reciprocating engines, and more particularly to those comprising a crankcase which is partly filled with lubricant and in which a varying pressure occurs due to the reciprocating movement of the piston.

As a rule, it is desirable in engines that the various pivots, for example, the bearings of the crankshaft and the bearings of the driving mechanism, should be properly lubricated. In many constructions of reciprocating engines the crankcase contains pivots which are difficult of access so that suitable lubrication of these points cannot be ensured with ordinary means. In the constructions hitherto known lubricating oil is sprayed to the pivots to be lubricated with the use of a splasher secured to a crank web. This method of lubrication is frequently not particularly suitable, especially if the pivots are provided comparatively high in the crankcase.

A primary object of the present invention is to provide means by which satisfactory lubrication of points difficult of access may be ensured.

For this purpose the reciprocating engine according to the invention is characterized in that the crankcase communicates with an auxiliary space into which the variations in pressure in the crankcase are propagated. Then the means for such communication are so proportioned that, when the pressure in the crankcase is lower than the pressure in the auxiliary space, a medium contained in the auxiliary space is ejected from the auxiliary space into the crankcase.

The medium which is ejected from the auxiliary space into the crank case may either be a lubricant itself to so bring about direct lubrication of the parts to be lubricated, or it may function as means to carry along lubricant contained in the crankcase to the said parts to be lubricated to so perform the lubricating function indirectly, so to speak. It will be apparent, therefore, that the medium which is ejected from the auxiliary space into the crankcase may alternately consist either of air or another gas or of the lubricant per se. In the former case the air brings about the lubrication indirectly as referred to just previously, since the lubricant is supplied by such air.

The variations in pressure which occur in the crankcase are propagated into the auxiliary space. If the pressure in the crankcase decreases, the pressure in the auxiliary case will temporarily be higher than the pressure in the crankcase so that medium is ejected from the auxiliary space into the crankcase. If this medium is a gas, for example air, it will be capable of taking lubricating oil from the crankcase to the parts to be lubricated by the provision of a suitable outflow aperture and, if desired, auxiliary partitions. If the medium is a lubricant, it may be ejected directly on to said parts. When the pressure in the crankcase increases again, an amount of medium will be pressed into the auxiliary space, this medium being ejected again with the subsequent decrease in pressure in the crankcase.

Since, as a rule, it is desirable that the lubricant reach all such parts to be lubricated as the various pivots in the crankcase in sufficient quantity, in one embodiment of the invention the crankcase contains means by which the medium ejected from the auxiliary space into the crankcase is atomized. Thus, the undesirable consequence that some parts may be lubricated abundantly and others insufficiently, may also be avoided.

In a further embodiment of the invention, the auxiliary space is partly filled with lubricant. An enclosed amount of gas is then provided above the level of the lubricant and the communication between the crankcase and the auxiliary space is located below the level of the lubricant in the crankcase. In this embodiment an amount of lubricant is forced into the auxiliary space during the periods of high pressure in the crankcase so that the pressure of the gas above the level of the lubricant increases, whereas during the periods of low pressure at least a portion of the lubricant contained in the auxiliary space is ejected into the crankcase and, if desired, is atomized.

In a further advantageous embodiment of the invention, the auxiliary space is connected to the crankcase by two separate means of communication. One of said means is connected for such communication between the auxiliary space and the crankcase space above the level of the lubricant in the latter. The other one of such means is connected for such communication between said auxiliary space and said crankcase space, in said crankcase below the liquid level therein. Each group may be constituted by one or more connections.

When using the above-described construction it is important, according to a further embodiment of the invention, that the means of communication which is connected to the crankcase space above the level of the lubricant therein should have a resistance smaller than that of the other of said means of communication.

In another embodiment of the invention, it is advantageous that the means of communication which is connected to the space above the level of the lubricant in the crankcase, should be directed so that the lubricant ejected by this means into the crankcase strikes the moving parts provided therein. In this embodiment, if desired, means may be provided for atomizing the ejected lubricant.

Figure 2:
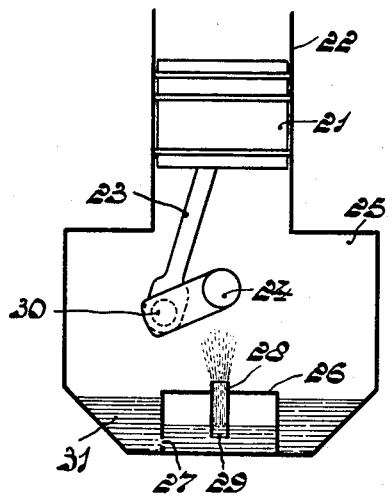

The invention will now be explained more fully by reference to the accompanying drawing, wherein:

Fig. 1 is a diagrammatic cross-sectional view of a reciprocating engine with one embodiment of the invention applied to the crankcase thereof wherein the lubricant is forced into the auxiliary space due to the variations in pressure, a connection being provided only between the crankcase and the auxiliary space; and Fig. 2 is a diagrammatic cross-sectional view of a reciprocating engine with another embodiment of the invention applied to the crankcase thereof wherein two different connections between the auxiliary space and the crankcase are employed.

In the reciprocating engine shown in Fig. 1, a piston 1 reciprocates in a cylinder 2. The piston 1 is connected with the use of a driving rod 3 to a crank 4 of a crankshaft 11 located in crankcase 5. The reciprocating piston 1 causes periodic variations in pressure in the crankcase 5. The latter is partly filled with an amount of lubricant 6. Provided inside the crankcase 5 is an auxiliary space 7 which communicates by way of a tube 8 with the crankcase 5. An aperture 9 in this communicating tube 8 is arranged to lie beneath the lowest possible level of the lubricant 6. During the moments of highest pressure in the crankcase 5, that is to say when the piston 1 occupies its lowest position, an amount of lubricant is forced through aperture 9 and tube 8 toward the auxiliary space 7. The air in the auxiliary space 7 is thus subjected to a pressure which substantially equals the maximum pressure in the crankcase 5. When the piston 1 moves upwards so that the pressure in the crankcase 5 decreases, the lubricant is forced from the tube 8 through the aperture 9 into the crankcase 5 by the action of the comparatively high pressure of the air in the auxiliary space 7. This lubricant is ejected against a partition 10 and is thus atomized so that a fog of lubricant contacts with the rotating parts in the crankcase 5. It will be evident that the means for atomizing the lubricant may alternatively have other forms. Thus, in certain cases, for example, a gauze located in the path of the ejected lubricant will also prove satisfactory.

In the reciprocating engine shown in Fig. 2, similarly as in the device of Fig. 1 just described, a piston 21 reciprocates in a cylinder 22. The piston 21 is connected by means of a driving rod 23 to a crank 30 of a crankshaft 24 located in crankcase 25. Variations in pressure occur in the crankcase 25 due to the reciprocating movement of the piston 21, as described hereinbefore with regard to Fig. 1. The crankcase 25 communicates with an auxiliary space 26 through an aperture 27 and through a tube 28. The crankcase is filled with lubricant 31, the level of the lubricant 31 invariably lying above the aperture 27. The tube 28, however, is invariably above the level of the lubricant 31, but is as low as possible while so being. When the piston 21 moves downwards, the pressure in the crankcase 25 increases so that the lubricant is forced through the aperture 27 into the auxiliary space 26. The lubricant closes the lower aperture 29 of the tube 28, so that air in the space 26 is compressed. When the pressure in the crankcase 25 decreases due to the piston 21 moving upwards, the lubricant in the auxiliary space 26, due to the pressure of the air therein, is pressed through both the aperture 27 and the tube 28 into the crankcase 25. If the resistance of the tube 28 is lower than the resistance of the aperture 27, the maximum amount of lubricant will be forced through the tube 28 into the crankcase 26. The lubricant may be ejected towards the parts to be lubricated by suitable positioning of the tube 28. Thus, for example, the tube 28 may occupy either a vertical or an inclined position according to the relative location of the parts which are to be lubricated. Of course, it is also possible to provide a plurality of tubes 28. For satisfactory operation of the device it is important that both apertures 27 and 29 are not too far from the bottom of the container.

It will be understood that various other modifications in structure and assembly may be undertaken without departing from the spirit of the present invention. The invention, therefore, is to be limited only by the scope of the appended claims.

What we claim is:

1. A reciprocating engine comprising means defining a crankcase space, a cylinder opening out into said crankcase space, a crankshaft in said crankcase space, a piston in said cylinder connected by a rod to said crankshaft whereby reciprocation of said piston in said cylinder causes pressure variations in said crankcase; a pond of lubricant in said crankcase space subject to said pressure variations, means defining an auxiliary space positioned a predetermined distance above and spaced from said pond of lubricant, a single connecting means between said crankcase space and said auxiliary space, said connecting means connecting into the bottom of said auxiliary space and having a varying supply of lubricant therein, said auxiliary space having trapped gas therein over said lubricant in said connecting means, said connecting means opening into said crankcase space below the level of said pond of lubricant, whereby recurrent increases of pressure in said crankcase space forces flow of lubricant from said crankcase space toward said auxiliary space to compress the gas trapped therein and alternating recurrent decreases of pressure in said crankcase space allows forcing of lubricant out of said auxiliary space into said crankcase space by the pressure of said trapped gas, and a separate partition positioned adjacent one end of said connecting means and in the path of the lubricant forced out of said auxiliary space thereby atomizing and causing a fog of lubricant in said crankcase space.

2. A reciprocating engine comprising means defining a crankcase space, a cylinder opening out into said crankcase space, a crankshaft in said crankcase space, a piston in said cylinder connected by a rod to said crankshaft whereby reciprocation of said piston in said cylinder causes pressure variations in said crankcase, a pond of lubricant in said crankcase space subject to said pressure variations, means defining an auxiliary space positioned a predetermined distance above and spaced from said pond of lubricant, a single tube-like connecting means between said crankcase space and said auxiliary space, said connecting means connecting into the bottom of said auxiliary space and having a varying supply of lubricant therein, said auxiliary space having trapped gas therein over said lubricant in said connecting means, said connecting means opening into said crankcase space below the level of said pond of lubricant, whereby recurrent increases of pressure in said crankcase space forces flow of lubricant from said crankcase space toward said auxiliary space to compress the gas trapped therein and alternating recurrent decreases of pressure in said crankcase space allows forcing of lubricant out of said auxiliary space into said crankcase space by the pressure of said trapped gas, and an inclined separate partition positioned adjacent the end of said connecting means opening into said crankcase space, said partition being in the path of the lubricant forced out of said connecting means thereby atomizing and causing a fog of lubricant in said crankcase space.

References Cited in the file of this patent

UNITED STATES PATENTS

| 797,046 | Casler | Aug. 15, 1905 |
| 904,132 | Johnston | Nov. 17, 1908 |
| 1,053,939 | Brooks | Feb. 18, 1913 |
| 1,091,249 | Schonland | Mar. 24, 1914 |
| 1,094,431 | Frederickson | Apr. 28, 1914 |
| 1,144,101 | Bradbury | June 22, 1915 |
| 1,354,663 | Kirkman | Oct. 5, 1920 |
| 2,316,000 | James | Apr. 6, 1943 |

FOREIGN PATENTS

| 22,059 | Great Britain | of 1904 |
| 22,346 | Great Britain | of 1912 |